(12) United States Patent
Fujishima et al.

(10) Patent No.: US 11,294,746 B2
(45) Date of Patent: Apr. 5, 2022

(54) EXTRACTING MOVING IMAGE DATA FROM AN ERROR LOG INCLUDED IN AN OPERATIONAL LOG OF A TERMINAL

(71) Applicant: FUJITSU LIMITED, Kawasaki (JP)

(72) Inventors: Toshiyuki Fujishima, Kawasaki (JP); Susumu Koga, Kawasaki (JP); Masahiro Nakayama, Odawara (JP); Tomoyuki Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/027,387

(22) Filed: Sep. 21, 2020

(65) Prior Publication Data

US 2021/0096940 A1  Apr. 1, 2021

(30) Foreign Application Priority Data

Sep. 30, 2019  (JP) .............................. JP2019-179229

(51) Int. Cl.
*G06F 11/07* (2006.01)

(52) U.S. Cl.
CPC ...... *G06F 11/0727* (2013.01); *G06F 11/0733* (2013.01); *G06F 11/0775* (2013.01)

(58) Field of Classification Search
CPC ............. G06F 11/0727; G06F 11/0733; G06F 11/0775; G06F 16/783; G06F 16/7837; G06F 16/7844; G06K 9/00711
See application file for complete search history.

(56) References Cited

U.S. PATENT DOCUMENTS

| | | | | |
|---|---|---|---|---|
| 2007/0201373 | A1* | 8/2007 | Williams | G06F 9/453 370/241 |
| 2012/0144373 | A1* | 6/2012 | Cook | G06F 11/3668 717/125 |
| 2012/0308194 | A1* | 12/2012 | Fujiwara | H04N 5/783 386/230 |
| 2012/0331332 | A1* | 12/2012 | Carey | G06F 11/1471 714/2 |
| 2015/0109453 | A1* | 4/2015 | Horiyama | H04N 1/0048 348/159 |
| 2015/0213838 | A1* | 7/2015 | Dinev | G11B 27/031 386/224 |
| 2015/0278076 | A1* | 10/2015 | Bs | G06F 11/3664 714/38.1 |
| 2015/0355825 | A1* | 12/2015 | Bhogal | G06F 11/302 715/720 |

(Continued)

FOREIGN PATENT DOCUMENTS

| | | |
|---|---|---|
| JP | 2009-113248 A | 5/2009 |
| JP | 2012-253559 A | 12/2012 |
| JP | 2015-69419 A | 4/2015 |

*Primary Examiner* — Joseph O Schell
(74) *Attorney, Agent, or Firm* — Fujitsu Patent Center

(57) ABSTRACT

A non-transitory computer-readable storage medium storing a program that causes a computer to execute a process, the process includes determining whether an error log is included in an operation log over a terminal; when the error log is included in the operation log, specifying a start timing and a stop timing of a script including the error log stored in a memory based on the operation log; and extracting moving image data output to the terminal during execution of the script based on time information related to the specified start timing and stop timing of the script.

11 Claims, 14 Drawing Sheets

(56) References Cited

U.S. PATENT DOCUMENTS

2016/0196252 A1\* 7/2016 Wu .................. G06F 16/43
                                                715/231
2017/0352041 A1\* 12/2017 Ramamurthy ........ G06F 40/226
2020/0201699 A1\* 6/2020 Yu .................... G06F 11/32

\* cited by examiner

FIG. 6

LOG (121)

| ROBOT ID | LOG ID | LOG MESSAGE |
|---|---|---|
| 1 | 1 | "processName" : "testRobot", "message" : "Robot started.", "timestamp" : "20xx/01/05 13:05 00:00", "level" : "Information" , ... |
| 1 | 2 | "processName" : "testRobot", "message" : "Click 'A' button.", "timestamp" : "20xx/01/05 13:05 10:00", "level" : "Information" , ... |
| 1 | 3 | "processName" : "testRobot", "message" : "Robot finished.", "timestamp" : "20xx/01/05 13:05 20:00", "level" : "Information" , ... |
| 2 | 4 | "processName" : "testRobot", "message" : "Robot started.", "timestamp" : "20xx/01/05 13:10 00:00", "level" : "Information" , ... |
| 2 | 5 | "processName" : "testRobot", "message" : "Click 'B' button.", "timestamp" : "20xx/01/05 13:10 10:00", "level" : "Information" , ... |
| 2 | 6 | "processName" : "testRobot", "message" : "Click 'C' button. ; Cannot find UI Element.", "timestamp" : "20xx/01/05 13:10 15:00", "level" : "Error" , ... |
| 2 | 7 | "processName" : "testRobot", "message" : "Get 'A' Text. ; Cannot find UI Element.", "timestamp" : "20xx/01/05 13:10 45:00", "level" : "Error" , ... |
| 2 | 8 | "processName" : "testRobot", "message" : "Click 'D' button. ; Cannot find UI Element.", "timestamp" : "20xx/01/05 13:11 30:00", "level" : "Error" , ... |
| 2 | 9 | "processName" : "testRobot", "message" : "Robot finished.", "timestamp" : "20xx/01/05 13:11 31:00", "level" : "Information" , ... |

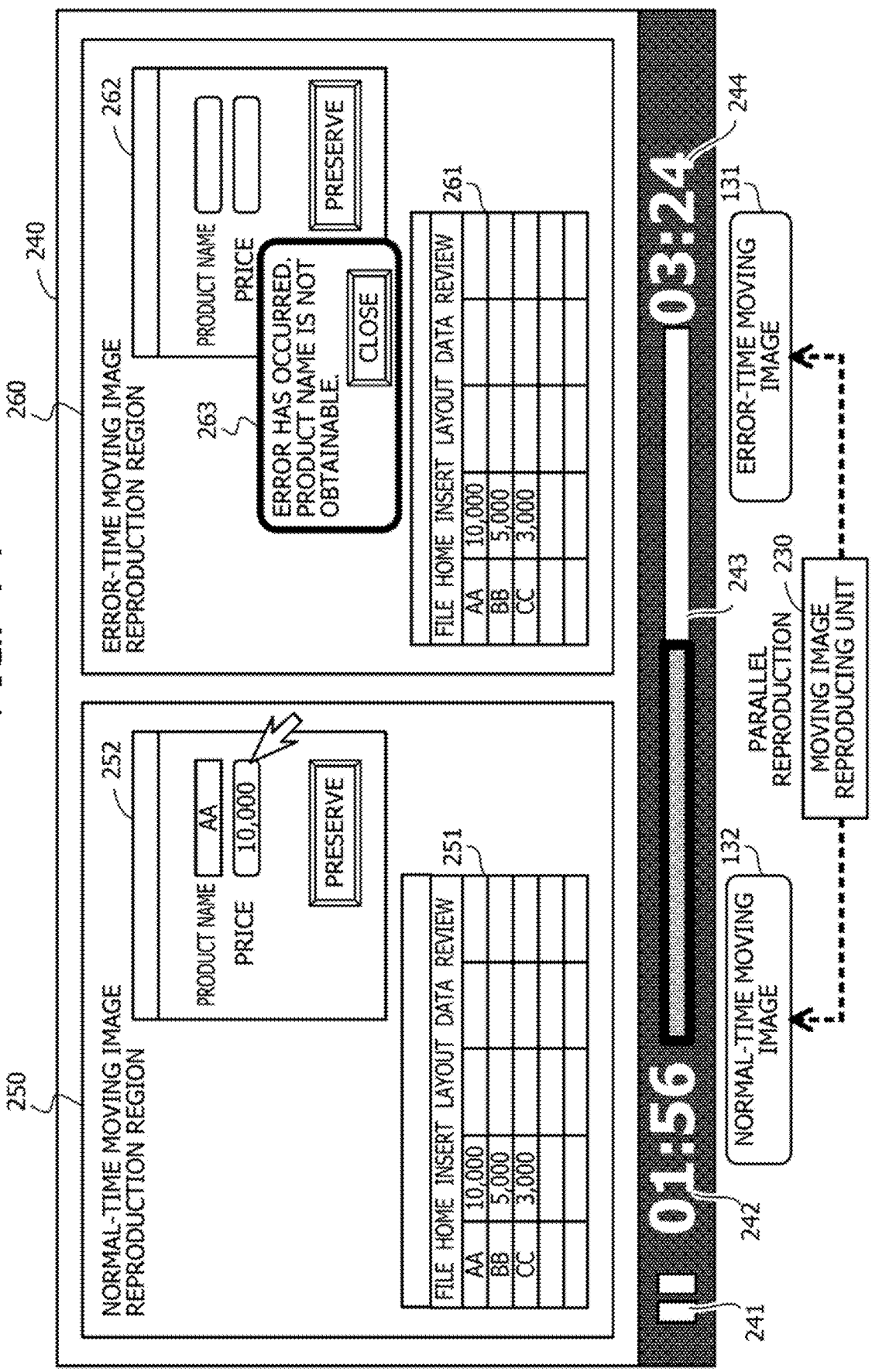

EXTRACTING MOVING IMAGE DATA FROM AN ERROR LOG INCLUDED IN AN OPERATIONAL LOG OF A TERMINAL

CROSS-REFERENCE TO RELATED APPLICATION

This application is based upon and claims the benefit of priority of the prior Japanese Patent Application No. 2019-179229, filed on Sep. 30, 2019, the entire contents of which are incorporated herein by reference.

FIELD

Embodiments described herein are related to a storage medium, an information processing method, and an information processing apparatus.

BACKGROUND

In an information processing apparatus such as a computer, work of a user using the information processing apparatus may be supported by a program. For example, according to a technique called robotic process automation (RPA), a work content of a user over a desktop screen of a terminal apparatus is described by using a script, and a user's screen operation is automated by executing the script.

In the development of a program, in a case where an error occurs during execution of the program in a computer, a developer acquires a log at the time of execution of the program, and performs work such as identification of the cause of the error and debugging based on the log. Therefore, a log acquisition method at the time of the occurrence of an error is considered.

For example, there has been proposed a control device that stores an execution program operating over the control device in a recording medium, and writes all the contents of a log over a rewritable memory mounted on the control device in the recording medium before the control device stops due to the occurrence of an error.

There is also a proposal of an automatic transaction apparatus that records log information in which an operation pattern of an abnormal operation caused by a customer's operation error is correlated with monitoring image data in a case where each unit of the automatic transaction apparatus performs an abnormal operation.

There has been proposed a recording/reproducing system that records a captured image in association with event information for specifying the image, and allows a user to select the event information determines a display method when the recorded image is reproduced, and reproduces the image on a display device according to the display method. For example, Japanese Laid-open Patent Publication No. 2009-113248, Japanese Laid-open Patent Publication No. 2015-69419, and Japanese Laid-open Patent Publication No. 2012-253559 are disclosed as the related art.

SUMMARY

According to an aspect of the embodiments, a non-transitory computer-readable storage medium storing a program that causes a computer to execute a process, the process includes determining whether an error log is included in an operation log over a terminal; when the error log is included in the operation log, specifying a start timing and a stop timing of a script including the error log stored in a memory based on the operation log; and extracting moving image data output to the terminal during execution of the script based on time information related to the specified start timing and stop timing of the script.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of a log;

FIG. 14 is a diagram illustrating an example of reproducing a moving image in the server apparatus.

DESCRIPTION OF EMBODIMENTS

In a case where at least a part of a screen operation of a user is automated by a script, a series of screens output by a terminal apparatus may be recorded by the terminal apparatus. In a case where an error occurs, the user may check a screen content at the time of the occurrence of the error from the recorded data and may use the screen content to identify a cause of the error. However, the recorded data may include an image corresponding to a screen operation using a script that has not caused an error or a screen operation performed by a user. Thus, it is not easy for the user to check the image at the time of error occurrence from the recorded data.

In view of the above, it is desirable to efficiently extract moving image data at the time of error occurrence.

Hereinafter, embodiments will be described with reference to the drawings.

First Embodiment

A first embodiment will be described.

Figure 1:
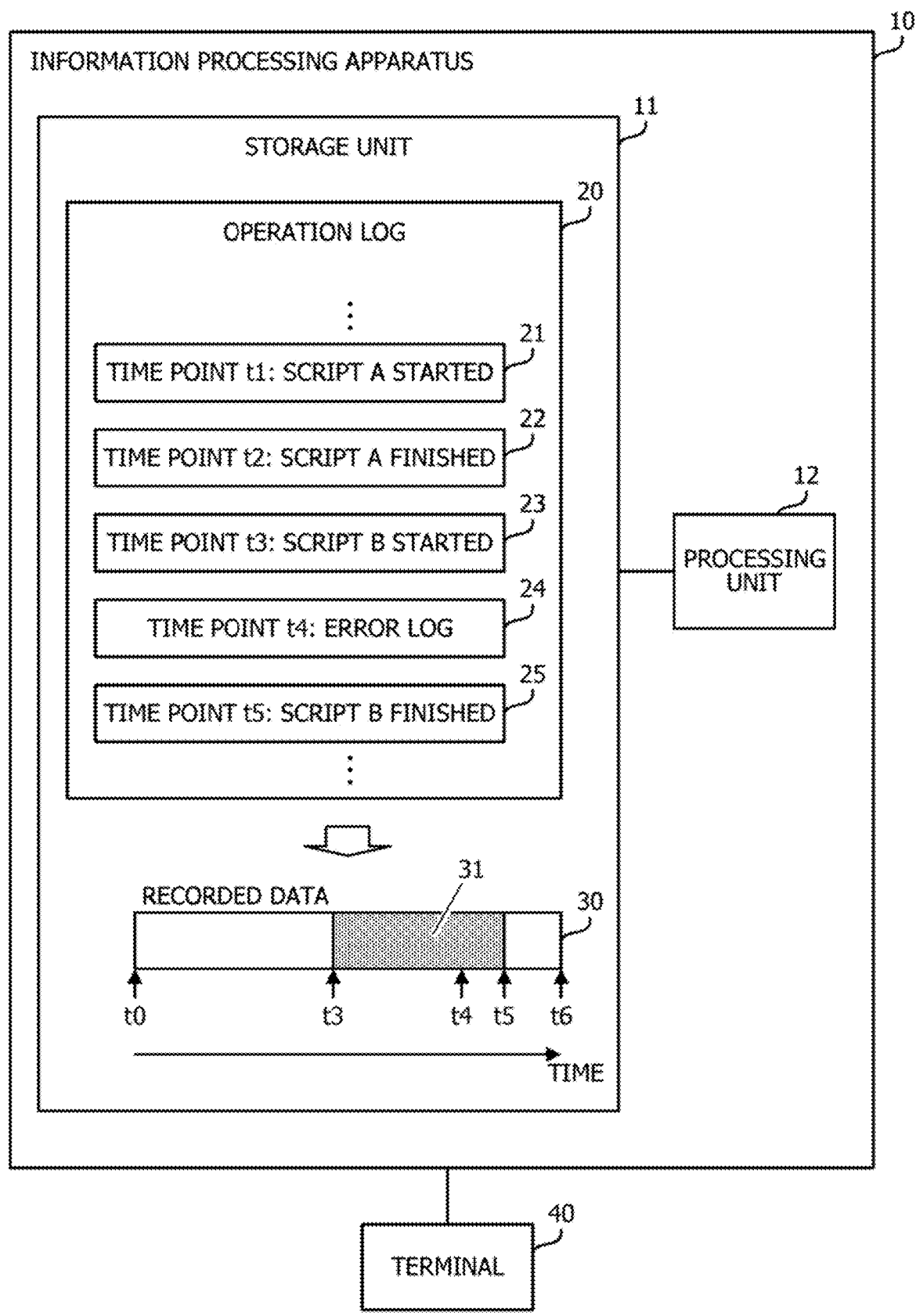
FIG. 1 is a diagram illustrating an information processing apparatus according to a first embodiment.

FIG. 1 is a diagram for describing an information processing apparatus according to a first embodiment.

An information processing apparatus 10 executes various pieces of software used for user's work. A terminal 40 is coupled to the information processing apparatus 10. The terminal 40 includes a display device such as a display. The terminal 40 may include an input device such as a mouse or a keyboard. The terminal 40 displays a screen for using a function of the software. The information processing apparatus 10 may display the screen on the terminal 40.

For example, an operating system (OS) of the information processing apparatus 10 provides a graphical user interface (GUI) based on a window system. For example, the information processing apparatus 10 displays a window for displaying an operation screen for software on the terminal 40, and receives a user's operation on the window. The user may use the function of the software by performing an input operation into the window using the input device of the terminal 40. The user may also input information of one piece of software to another piece of software through an operation of copying information in one window to another window.

The information processing apparatus 10 automates the user's screen operation. An example of the technique related to the automation is RPA. The information processing apparatus 10 stores a script in which a content of work performed through the user's screen operation is described, and executes the script to automate the user's screen operation. For example, the script may be created by the user, or may be created by a support tool that supports programming based on flowchart data created by the user. When the created script is executed, an error may occur. Therefore, the information processing apparatus 10 supports the investigation of a cause of the error performed by the user.

The information processing apparatus 10 includes a storage unit 11 and a processing unit 12. The storage unit 11 may be a volatile storage device such as a random-access memory (RAM), and may be a nonvolatile storage device such as a hard disk drive (HDD) or a flash memory. The processing unit 12 may include a central processing unit (CPU), a digital signal processor (DSP), an application-specific integrated circuit (ASIC), a field-programmable gate array (FPGA), or the like. The processing unit 12 may be a processor that executes a program. The "processor" referred to herein may include a set of a plurality of processors (a multiprocessor).

The storage unit 11 stores a script. The storage unit 11 stores an operation log 20 and recorded data 30. The operation log 20 is a log related to an operation over the terminal 40. The recorded data 30 is data obtained by recording a series of screens output to the terminal 40. The recording is started, for example, when a predetermined service serving as a base for executing the script is activated, and is finished when the service is finished. The operation log 20 and the recorded data 30 are acquired by, for example, the processing unit 12.

The processing unit 12 executes the script stored in the storage unit 11. The processing unit 12 performs a predetermined screen operation by executing the script. A screen content displayed on the terminal 40 changes in accordance with the screen operation using the script. The processing unit 12 records a series of screens displayed on the terminal 40 in the recorded data 30. The processing unit 12 records a log record corresponding to the execution of the script in the operation log 20. The log record includes a time stamp indicating an output time of the log record.

The processing unit 12 determines whether or not an error log is included in the operation log 20. In a case where it is determined that the error log is included, the processing unit 12 specifies a start timing and a stop timing of the script including the error log stored in the storage unit 11 based on the operation log 20. The "script including an error log" may also be referred to as a script corresponding to the error log or a script that has generated the error log.

For example, the operation log 20 includes log records 21, 22, 23, 24, and 25 in a time-series order. The log record 21 is a normal log indicating that execution of a script A is started at time point t1. The log record 22 is a normal log indicating that the execution of the script A is finished at time point t2. The log record 23 is a normal log indicating that execution of a script B is started at time point t3. The log record 24 is an error log indicating that an error occurred at time point t4. The log record 25 is a normal log indicating that the execution of the script B is finished at time point t5. Among the time points t1 to t5, time point t1 is the oldest time, and late times are indicated in order of t2, . . . , and t5, and time point t5 is the latest time.

In this case, the processing unit 12 determines that the operation log 20 includes an error log. The time stamp of the log record 24 corresponding to the error log is time point t4. Time point t4 is a time point between the execution start time point t3 of the script B and the execution finish time point t5 of the script B. Therefore, the processing unit 12 specifies that the log record 24 is an error log related to the script B. Alternatively, in a case where each log record includes identification information of a script related to an event, the processing unit 12 may specify the script B from the identification Information included in the log record 24.

In this case, in a first example, the processing unit 12 specifies the start timing of the script B including the error log as time point t3 and specifies the stop timing of the script B as time point t5 based on the operation log 20. Alternatively, in a second example, the processing unit 12 may specify the stop timing of the script B as time point t4 of the error log immediately before the execution finish time point t5 of the script B.

The processing unit 12 extracts moving image data output to the terminal 40 during the execution of the script based on the time information regarding the start timing and the stop timing of the specified script. For example, recording of the recorded data 30 is started at time point t0 and is finished at time point t6. Time point t0 is a time before time point t1. Time point t6 is a time after time point t5. Time point t6 may be a time after a time period in which the processing unit 12 executes extraction of moving image data. For example, the extraction of the moving image data may be performed during recording of the recorded data 30.

In the first example described above, with respect to the script B related to the error log, the processing unit 12 may specify the start timing of the script B as time point t3 and specify the stop timing of the script B as time point t5. Therefore, the processing unit 12 extracts moving image data 31 from time point t3 to time point t5 from the recorded data 30.

Alternatively, in the second example described above, with respect to the script B related to the error log, the processing unit 12 may specify the start timing of the script B as time point t3 and specify the stop timing of the script B as time point t4. Therefore, the processing unit 12 may extract moving image data from time point t3 to time point t4 from the recorded data 30. Alternatively, the processing unit 12 may extract moving image data from time point t3 to a predetermined time (for example, 10 seconds) after time point t4 in the recorded data 30.

According to the information processing apparatus 10, it is determined whether or not an error log is included in the operation log 20 over the terminal 40. In a case where it is determined that the error log is included, the start timing and the stop timing of the script including the error log, stored in the storage unit 11, are specified based on the operation log 20. The moving image data 31 output to the terminal 40 during the execution of the script is extracted based on the time information regarding the start timing and the stop timing of the specified script.

Consequently, it is possible to efficiently extract moving image data at the time of error occurrence.

For example, the processing unit 12 may appropriately extract the moving image data 31 including a screen operation related to the error based on the time information from the start timing to the stop timing of the script. Therefore, a user does not have to perform work of retrieving moving image of a screen operation related to an error from the entire recorded data 30. Therefore, the user may efficiently investigate a cause of the error.

For example, the processing unit 12 may display the moving image data 31 on the terminal 40. The processing unit 12 may transmit the script, the operation log 20, and the moving image data 31 to another information processing apparatus used by a technical supporter who supports the development of a script. The user or the technical supporter may easily check an operation content of a screen at the time of error occurrence by viewing a moving image reproduced based on the moving image data 31, and may thus efficiently investigate a cause of the error occurrence along with the script and the operation log 20.

Second Embodiment

Next, a second embodiment will be described.

Figure 2:
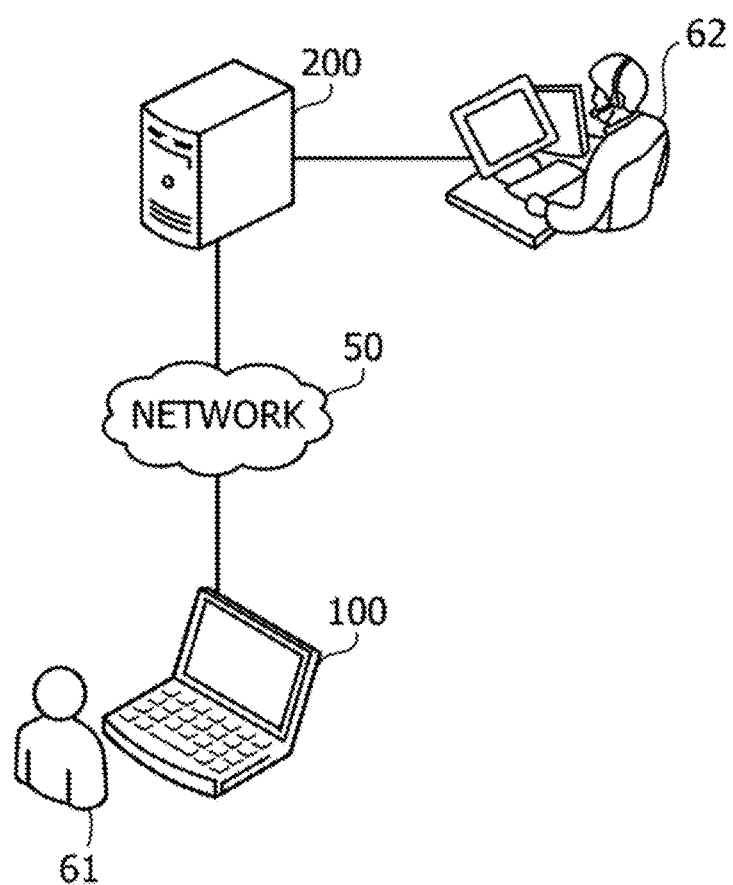
FIG. 2 is a diagram illustrating an example of an information processing system according to a second embodiment.

FIG. 2 is a diagram illustrating an example of an information processing system according to a second embodiment.

The information processing system according to the second embodiment includes a terminal apparatus 100 and a server apparatus 200. The terminal apparatus 100 and the server apparatus 200 are coupled to a network 50. The network 50 is a local area network (LAN), the Internet, or the like. The terminal apparatus 100 is used by a user 61. The server apparatus 200 is used by a technical supporter 62.

The terminal apparatus 100 is a client computer that provides an RPA development environment. The RPA technique automates an operation on a desktop screen in the terminal apparatus 100 or another terminal apparatus, and thus improves the work efficiency. In the terminal apparatus. The terminal apparatus 100 is an example of the information processing apparatus 10 according to the first embodiment.

In order to use RPA, the user 61 programs RPA by using the terminal apparatus 100. For example, the terminal apparatus 100 provides a program development tool for RPA. The user 61 may develop a program through an intuitive operation such as creating a flowchart by using the development tool. An RPA program is described using a markup language such as Extensible Application Markup Language (XAML).

The server apparatus 200 is a server computer used to support the user in developing a program. The server apparatus 200 collects information regarding investigation materials when the RPA program does not operate properly from the terminal apparatus 100, and presents the information to the technical supporter 62. The technical supporter 62 analyzes the information regarding the investigation materials to specify a cause, and notifies the user 61 of a solution.

Figure 3:
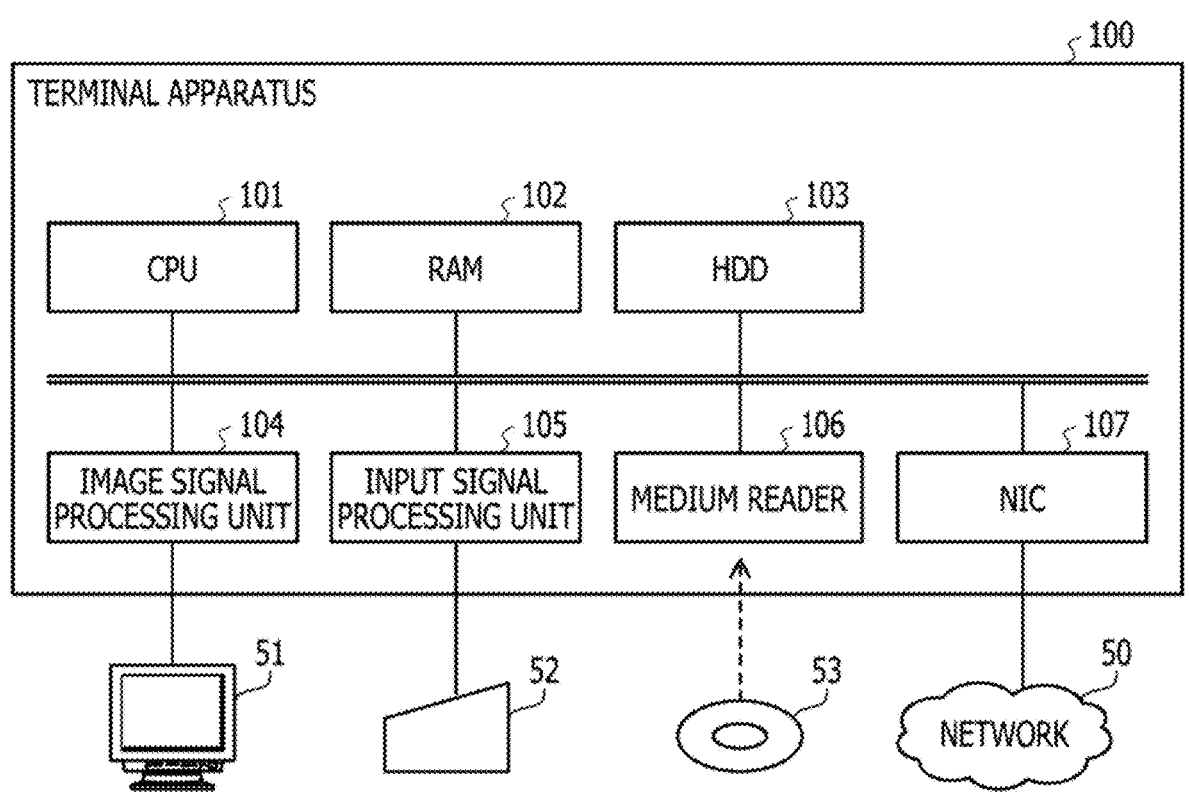
FIG. 3 is a block diagram illustrating an example of hardware of a terminal apparatus.

FIG. 3 is a block diagram illustrating an example of hardware of the terminal apparatus.

The terminal apparatus 100 includes a CPU 101, a RAM 102, an HDD 103, an image signal processing unit 104, an input signal processing unit 105, a medium reader 106, and a network interface card (NIC) 107. The CPU 101 corresponds to the processing unit 12 of the first embodiment. The RAM 102 or the HDD 103 corresponds to the storage unit 11 of the first embodiment.

The CPU 101 is a processor that executes a command of a program. The CPU 101 loads at least a part of a program or data stored in the HDD 103 into the RAM 102, and executes the program. The CPU 101 may include a plurality of processor cores. The terminal apparatus 100 may include a plurality of processors. Processes which will be described below may be executed in parallel by using a plurality of processors or processor cores. A set of the plurality of processors will be referred to as a "multiprocessor" or merely referred to as a "processor" in some cases.

The RAM 102 is a volatile semiconductor memory that temporarily stores the program executed by the CPU 101 and data used for the operation by the CPU 101. The terminal apparatus 100 may include memories of types other than the RAM, and may include a plurality of memories.

The HDD 103 is a nonvolatile storage device that stores software programs such as an OS, middleware, and application software, and data. The terminal apparatus 100 may include other types of storage devices such as a flash memory and a solid-state drive (SSD), and may include a plurality of nonvolatile storage devices.

The image signal processing unit 104 outputs an image to a display 51 coupled to the terminal apparatus 100 in accordance with an instruction from the CPU 101. A GUI provided by the OS of the terminal apparatus 100 is displayed on the display 51. For example, a window system is used for the GUI. A screen of the GUI displayed on the display 51 may be referred to as a desktop screen. Any type of display such as a cathode ray tube (CRT) display, a liquid crystal display (LCD), a plasma display, or an organic electro-luminescence (OEL) display may be used as the display 51.

The input signal processing unit 105 acquires an input signal from an input device 52 coupled to the terminal apparatus 100, and outputs the input signal to the CPU 101. A pointing device such as a mouse, a touch panel, a touch pad, or a trackball, a keyboard, a remote control unit, a button switch, or the like may be used as the input device 52. A plurality of types of input devices may be coupled to the terminal apparatus 100.

The medium reader 106 is a reading device that reads a program or data stored in a recording medium 53. For example, a magnetic disk, an optical disc, a magneto-optical (MO) disk, or a semiconductor memory may be used as the recording medium 53. The magnetic disk includes a flexible disk (FD) and an HDD. The optical disc includes a compact disc (CD) and a digital versatile disc (DVD).

For example, the medium reader 106 copies a program or data read from the recording medium 53 into another recording medium such as the RAM 102 or the HDD 103. The read program is executed by, for example, the CPU 101. The recording medium 53 may be a portable recording medium, and may be used to distribute the program and the data. The recording medium 53 and the HDD 103 will be referred to as computer readable recording medium in some cases.

The NIC 107 is coupled to the network 50 and is an interface that communicates with another computer via the network 50. The NIC 107 is coupled to a communication device such as a switch or a router via a cable.

The server apparatus 200 is also realized by hardware similar to that of the terminal apparatus 100.

Figure 4:
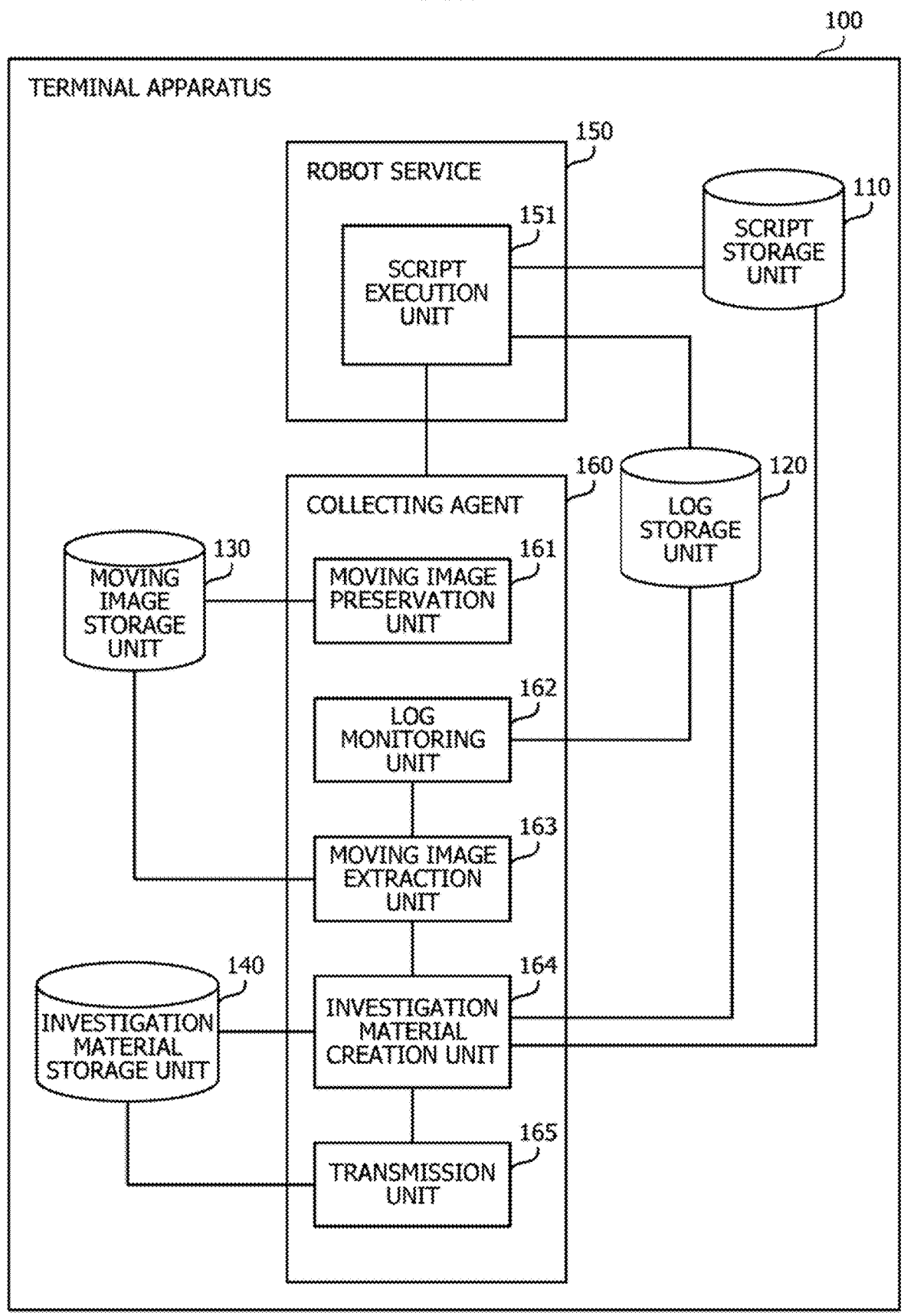
FIG. 4 is a block diagram illustrating a functional example of the terminal apparatus.

FIG. 4 is a block diagram illustrating a functional example of the terminal apparatus.

The terminal apparatus 100 includes a script storage unit 110, a log storage unit 120, a moving image storage unit 130, an investigation material storage unit 140, a robot service 150, and a collecting agent 160. Storage regions of the RAM 102 and the HDD 103 are used for the script storage unit 110, the log storage unit 120, the moving image storage unit 130, and the investigation material storage unit 140. The robot service 150 and the collecting agent 160 are realized by a program.

The script storage unit 110 stores a script created by the user 61. The script corresponds to an RPA program. The script is executed by the robot service 150.

The log storage unit 120 stores a log created by the robot service 150 according to the execution of the script. The log is information in a predetermined data format such as a file format or a table format. The log stored in the log storage unit 120 corresponds to the operation log 20 of the first embodiment.

The moving image storage unit 130 stores moving images acquired by the collecting agent 160. The moving images are obtained by recording changes in desktop screens during activation of the robot service 150.

The investigation material storage unit 140 stores information regarding investigation materials collected by the collecting agent 160. The information regarding the investigation materials is collected in a case where an error occurs during the execution of the script. The information regarding the investigation materials includes a script in which an error has occurred, a log, and moving image data during execution of the script.

The robot service 150 is an execution platform of the RPA. The robot service 150 performs robot processing according to execution of a script. The robot processing is processing of automatically performing an operation on a desktop screen of the terminal apparatus 100. The robot service 150 includes a script execution unit 151.

The script execution unit 151 executes the script stored in the script storage unit 110. The content of the desktop screen displayed on the display 51 changes according to the execution of the script. The script execution unit 151 generates a log record in accordance with an event occurring during execution of the script, and records the log record in a log stored in the log storage unit 120.

For example, the robot service 150 is activated according to a schedule set by the user 61, and causes the script execution unit 151 to execute a script designated in advance by the user 61. After execution of the scheduled script is finished, the robot service 150 stops. For example, the robot service 150 may be activated in response to an activation instruction being input by the user 61 and cause the script execution unit 151 to execute a script designated by the user 61. After the execution of the designated script is finished, the robot service 150 is stopped.

The collecting agent 160 collects information used to specify a cause of an error in response to the occurrence of the error during execution of a script. The collecting agent 160 creates information regarding an investigation material from the collected information and transmits the information to the server apparatus 200. The collecting agent 160 includes a moving image preservation unit 161, a log monitoring unit 162, a moving image extraction unit 163, an investigation material creation unit 164, and a transmission unit 165.

The moving image preservation unit 161 generates a moving image during an operation of the robot service 150 and preserves the moving image into the moving image storage unit 130. When the robot service 150 is activated, the moving image preservation unit 161 starts to record a desktop screen. When the robot service 150 is stopped, the moving image preservation unit 161 stops recording the desktop screen. The moving image preservation unit 161 stores a moving image that is being recorded into the moving image storage unit 130 in addition to a moving image of which recording is stopped.

The log monitoring unit 162 monitors the log stored in the log storage unit 120. For example, the log monitoring unit 162 monitors whether or not a log record having a log level equal to or higher than a predetermined level is recorded by referring to the log. In a case where a log record having a log level equal to or higher than a predetermined level is detected, the log monitoring unit 162 specifies, from the log, a start time and an finish time of a script operated over the robot service 150 with respect to the corresponding log record, and notifies the moving image extraction unit 163 of the start time and the finish time.

The log level is an index indicating the severity of a failure or the like. The log level includes, for example, debugging information (DEBUG), information (INFORMATION), warning (WARNING), an error (ERROR), and a fatal error (FATAL) in order from the lowest level to the highest level. The higher the log level, the higher the severity, and the lower the log level, the lower the severity. The log monitoring unit 162 detects, for example, the error or higher as the predetermined level. The log monitoring unit 162 notifies the moving image extraction unit 163 of a time point at which the error log was output last.

The moving image extraction unit 163 cuts out a moving image in a time period specified by the log monitoring unit 162 from the moving image stored in the moving image storage unit 130, and provides the moving image to the investigation material creation unit 164. The moving image extraction unit 163 adds information indicating a time point at which the error log was output last to the cutout moving image. For example, the information indicating the time point at which the error log was output last may be added to the cutout moving image as information such as a seek time position, and may be added to the moving image as additional information (for example, information displayed on a screen reproducing the moving image). In a case where there is a moving image preserved in the past in addition to a moving image that is being recorded with respect to the script in which the error has occurred, the moving image extraction unit 163 cuts out a portion of the moving image in a time zone in which the corresponding script is being executed from the preserved moving image and provides the cutout portion to the investigation material creation unit 164. As will be described later, the moving image cutout from the moving image preserved in the past is a moving image at the time of normal operation of the corresponding script.

When the moving image extracted by the moving image extraction unit 163 is acquired, the investigation material creation unit 164 acquires a source program of the corresponding script from the script storage unit 110. The investigation material creation unit 164 acquires a log from the log storage unit 120. The investigation material creation unit 164 creates investigation material information in which the source program, the log, and the moving image extracted by the moving image extraction unit 163 are collected as a single file, and stores the information into the investigation material storage unit 140. The investigation material information is, for example, an archive file. The investigation material creation unit 164 may compress the source program, the log, and the moving image extracted by the moving image extraction unit 163 to create an archive file.

The transmission unit 165 transmits the investigation material information stored in the investigation material creation unit 164 to the server apparatus 200.

For example, after creating the investigation material information, the investigation material creation unit 164 displays a check message indicating whether or not to transmit the investigation material information to the server apparatus 200 on the display 51. When an input indicating that the information is to be transmitted is received from the user 61, the investigation material creation unit 164 causes the transmission unit 165 to transmit the investigation material information. On the other hand, an input indicating that the information is not to be transmitted is received from the user 61, the investigation material creation unit 164 preserves the investigation material information into the investigation material storage unit 140, and finishes the process. Even in a case where the user 61 performs an input that the information is not to be transmitted, the investigation material information preserved in the investigation material storage unit 140 may be transmitted from the terminal apparatus 100 to the server apparatus 200 by using an electronic mail or the like at a desired timing thereafter.

Figure 5:
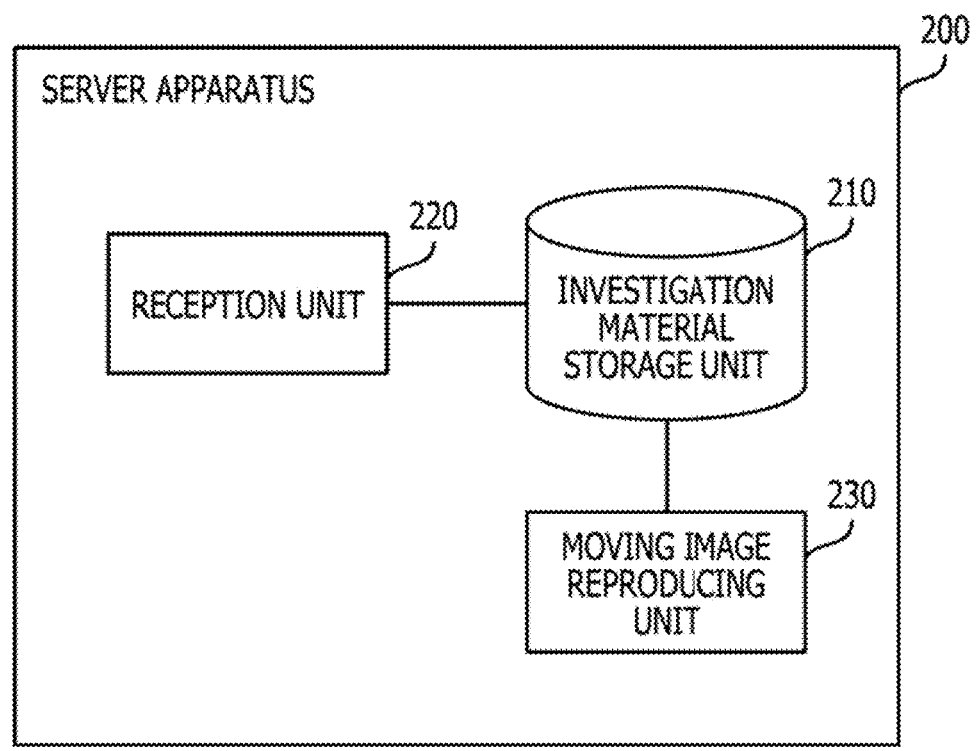
FIG. 5 is a block diagram illustrating a functional example of a server apparatus.

FIG. 5 is a block diagram illustrating a functional example of the server apparatus.

The server apparatus 200 includes an investigation material storage unit 210, a reception unit 220, and a moving image reproducing unit 230. A storage region such as a RAM or an HDD of the server apparatus 200 is used as the investigation material storage unit 210. The reception unit 220 and the moving image reproducing unit 230 are realized by a program.

The investigation material storage unit 210 stores the investigation material information received from the terminal apparatus 100.

The reception unit 220 receives the investigation material information from the terminal apparatus 100 and stores the information into the investigation material storage unit 210.

The moving image reproducing unit 230 reproduces the moving image included in the investigation material information stored in the investigation material storage unit 210, and displays the moving image on a display of the server apparatus 200 or a display of a terminal used by the technical supporter 62.

FIG. 6 is a diagram illustrating an example of a log.

A log 121 is stored in the log storage unit 120. The log 121 includes items of a robot identifier (ID), a log ID, and a log message.

A robot ID is registered in the item of the robot ID. The robot ID is identification information for identifying the activated robot service 150. Each time the robot service 150 is activated, a robot ID is assigned to the activated robot service 150. For example, the robot service 150 activated at a certain time point and the robot service 150 activated at another time point are assigned with different robot IDs to be distinguished from each other. A log ID is registered in the item of the log ID. The log ID is identification information for identifying a log record. A log message is registered in the item of the log message. The log message is a message indicating a content of an event that has occurred. The log message includes a time stamp, script identification information, and log level identification information.

For example, the log 121 includes a log record having a robot ID of "1", a log ID of "1", and log messages of "processName":"testRobot", "message":"Robot started.", "timestamp":"20xx/01/05 13:05 00:00", "level":"Information", . . . . This log record indicates that the robot ID of the activated robot service 150 is "1", and the log ID in the log 121 is "1". The log record indicates that a script identified by "processName" starts to be executed at 13:05:00 on January 5, 20xx ("Robot started."). The log record indicates that the log level (level) is "information" (Information).

As described above, in the log 121, an event that has occurred is identified by the description immediately after the "message" included in the log message. For example, the log record of the log ID "1" indicates that the robot service 150 starts to execute a script as described above. "Robot finished." in the log record of the log ID "3" Indicates that the execution of the script started at the time of the log ID "1" is finished. The log record of the log ID "4" indicates that the script starts to be executed by the robot service 150 thereafter. The log record of the log ID "9" indicates that the execution of the script started at the time of the log ID "4" is finished.

In the log 121, the log level is identified by the description immediately after "level" included in the log message. For example, the log records of the log IDs "6", "7", and "8" have a log level of "error" (Error).

In the example of the log 121, the log records of the log IDs "4" to "9" for the robot ID "2" include three error logs. The three error logs are log records of the log IDs "6" to "8". In this case, the log monitoring unit 162 determines that the log record of the log ID "8" is an error log that was output last, and embeds the time stamp included in the log record into a moving image at the time of error occurrence.

As a method of coding a script, there is a method of intentionally ignoring an assumed error by try-catch syntax or the like. The script may include a portion described with such a syntax. Therefore, in the log 121, log records of a plurality of error levels may be recorded for execution of a certain script. In such a case, it may be difficult to specify a portion where the script stops due to the occurrence of the error in a moving image at the time of the error occurrence. Therefore, as described above, the log monitoring unit 162 embeds the time stamp of the error log output last into a moving image at the time of the error (or preserves the time stamp as additional information), and may thus easily specify a scene in which the execution of the script is stopped due to the error in the moving image at the time of the error occurrence.

Since the script is finished after an error that may stop the script occurs, it is estimated that the log record of the error level output last is a log record indicating a cause of stopping of the script. Therefore, a time stamp of an error output last is set in a moving image at the time of error occurrence, and thus it is possible to easily specify a cause of stopping of a script when a plurality of errors occur.

Figure 7:
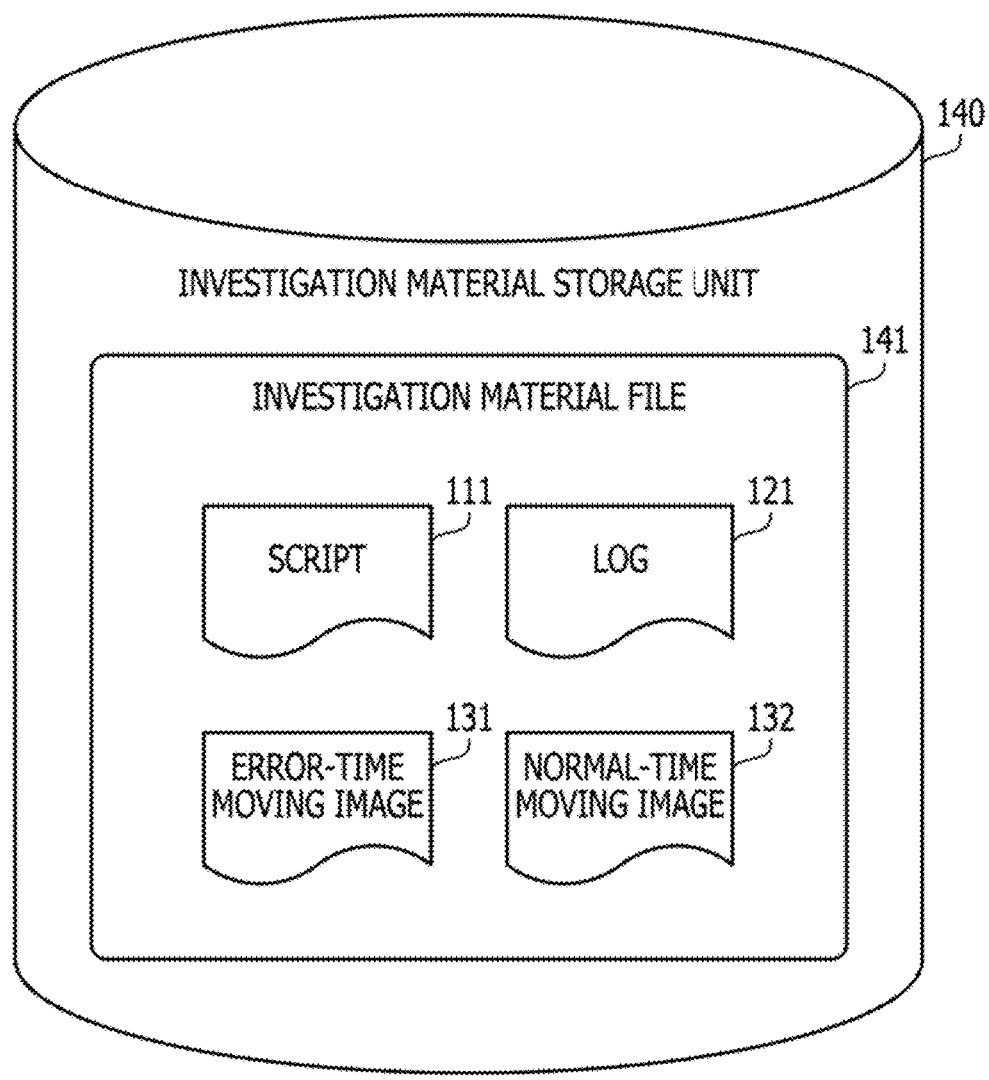
FIG. 7 is a diagram illustrating an example of an investigation material file.

FIG. 7 is a diagram illustrating an example of an investigation material file.

An investigation material file 141 is an example of the investigation material information. The investigation material file 141 includes a script 111, a log 121, an error-time moving image 131, and a normal-time moving image 132. The script 111 is a source program of the script that was being executed when an error occurred. The script 111 may be a source program (for example, a script set) of a plurality of scripts. The log 121 is a log stored in the log storage unit 120.

The error-time moving image 131 is a moving image at the time of error occurrence, extracted by the moving image extraction unit 163 from a moving image that is being recorded. The error-time moving image 131 is a moving image during execution of a script in which an error has occurred.

The normal-time moving image 132 is a moving image at the time of normal operation of the corresponding script, extracted by the moving image extraction unit 163 from a preserved moving image other than a moving image that is being recorded. However, the investigation material file 141 may not include the normal-time moving image 132.

Next, a process procedure in the terminal apparatus 100 will be described.

Figure 8:
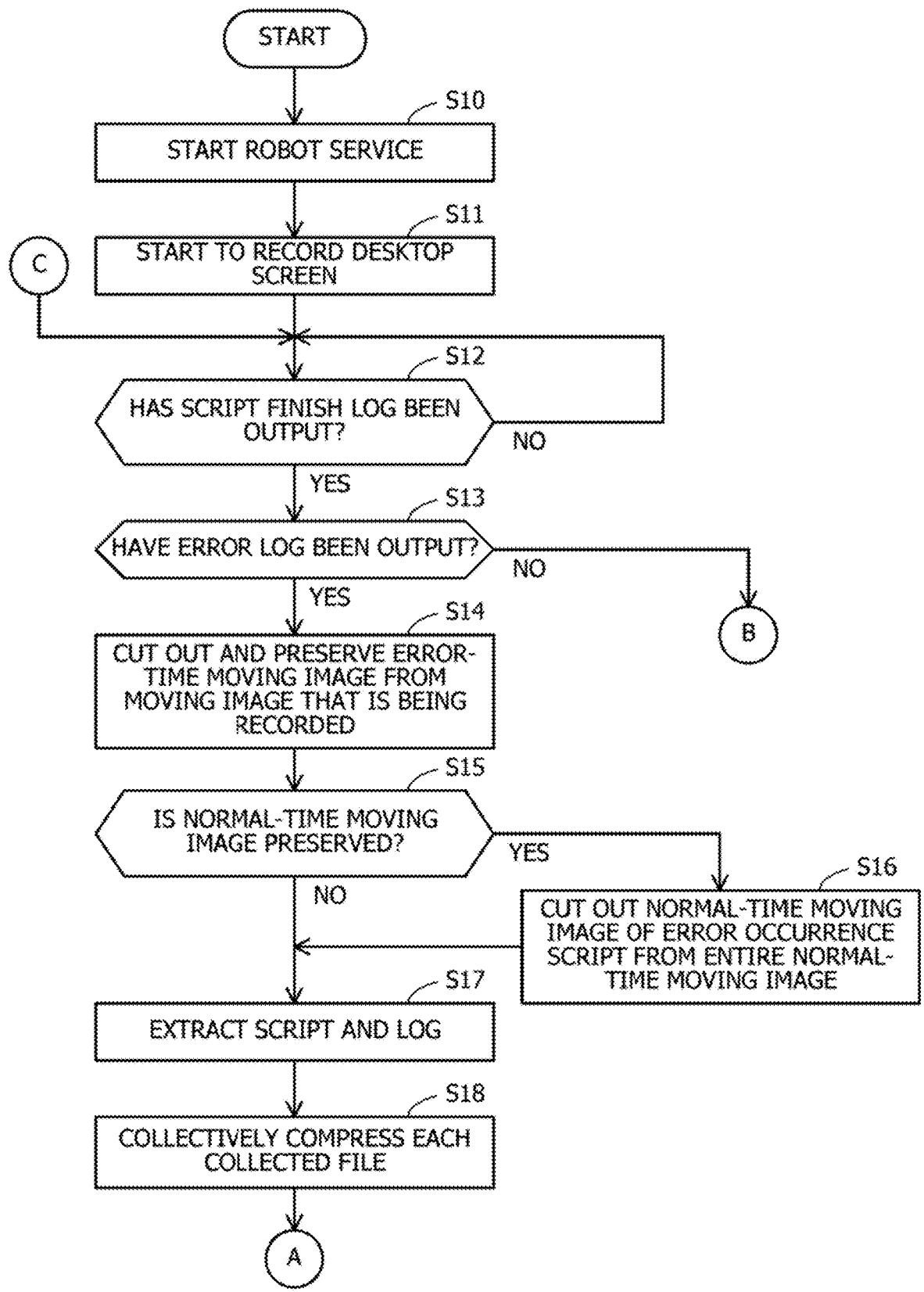
FIG. 8 is a flowchart illustrating a process example in the terminal apparatus.

FIG. 8 is a flowchart illustrating a process example in the terminal apparatus.

(S10) The robot service 150 is activated, and a process in the robot service 150 is started.

(S11) The moving image preservation unit 161 starts to record the desktop screen. The script execution unit 151 starts to execute the script 111 and starts to output a log record to the log storage unit 120.

(S12) The log monitoring unit 162 monitors the log 121 stored in the log storage unit 120 and determines whether or not a script finish log has been output. In a case where the script finish log is output, the process proceeds to step S13. In a case where the script finish log is not output, the process proceeds to step S12, and the log monitoring unit 162 continues monitoring of the log 121. The script finish log corresponds to a log record indicating that execution of the script is finished.

(S13) The log monitoring unit 162 determines whether an error log has been output in the current log 121 started to be output in step S11. In a case where the error log is output, the process proceeds to step S14. In a case where the error log is not output, the process proceeds to step S23 in FIG. 9.

(S14) The log monitoring unit 162 specifies the script 111 that has output the error log from the log 121. For example, the log monitoring unit 162 specifies identification information of the script 111 included in a log record in which a log level is an error. The log monitoring unit 162 refers to the log 121, specifies an execution start time and an execution finish time of the script 111, and notifies the moving image extraction unit 163 of the specified execution start time and execution finish time. In this case, the log monitoring unit 162 notifies the moving image extraction unit 163 of a time corresponding to a detected last error log and the identification information of the script 111 in which the error has occurred. The moving image extraction unit 163 cuts out and preserves the error-time moving image 131 corresponding to a time period from the execution start time to the execution finish time sent from the log monitoring unit 162, from a moving image that is being recorded. The moving image extraction unit 163 adds time information corresponding to the last error log to the error-time moving image 131. The moving image extraction unit 163 provides the extracted error-time moving image to the investigation material creation unit 164.

The moving image extraction unit 163 extracts the error-time moving image 131 corresponding to the time period from the execution start time to the execution finish time of the script 111 in which the error has occurred, but there may be other examples. For example, the moving image extraction unit 163 may extract a moving image corresponding to a time period from the execution start time of the script 111 to a time point at which the last error is output as the error-time moving image 131.

(S15) The moving image extraction unit 163 determines whether or not a normal-time moving image is preserved. In a case where the normal-time moving image is preserved, the process proceeds to step S16. In a case where the normal-time moving image is not preserved, the process proceeds to step S17.

(S16) The moving image extraction unit 163 cuts out a normal-time moving image of the script 111 from the entire normal-time moving image. For example, the moving image extraction unit 163 specifies a log record corresponding to the identification information of the corresponding script from the log 121, and specifies a time period in which the corresponding script is executed without causing an error from the start of execution to the finish of execution based on the log record. The moving image extraction unit 163 cuts out a moving image in the time period from the entire normal-time moving image to cut out the normal-time moving image of the script 111. The moving image extraction unit 163 provides the normal-time moving image of the script 111 to the investigation material creation unit 164.

(S17) The investigation material creation unit 164 extracts the script 111 from the script storage unit 110 and extracts the log 121 from the log storage unit 120.

(S18) The investigation material creation unit 164 collectively compresses the collected files to create the investigation material file 141. The process proceeds to step S19 in FIG. 9.

Figure 9:
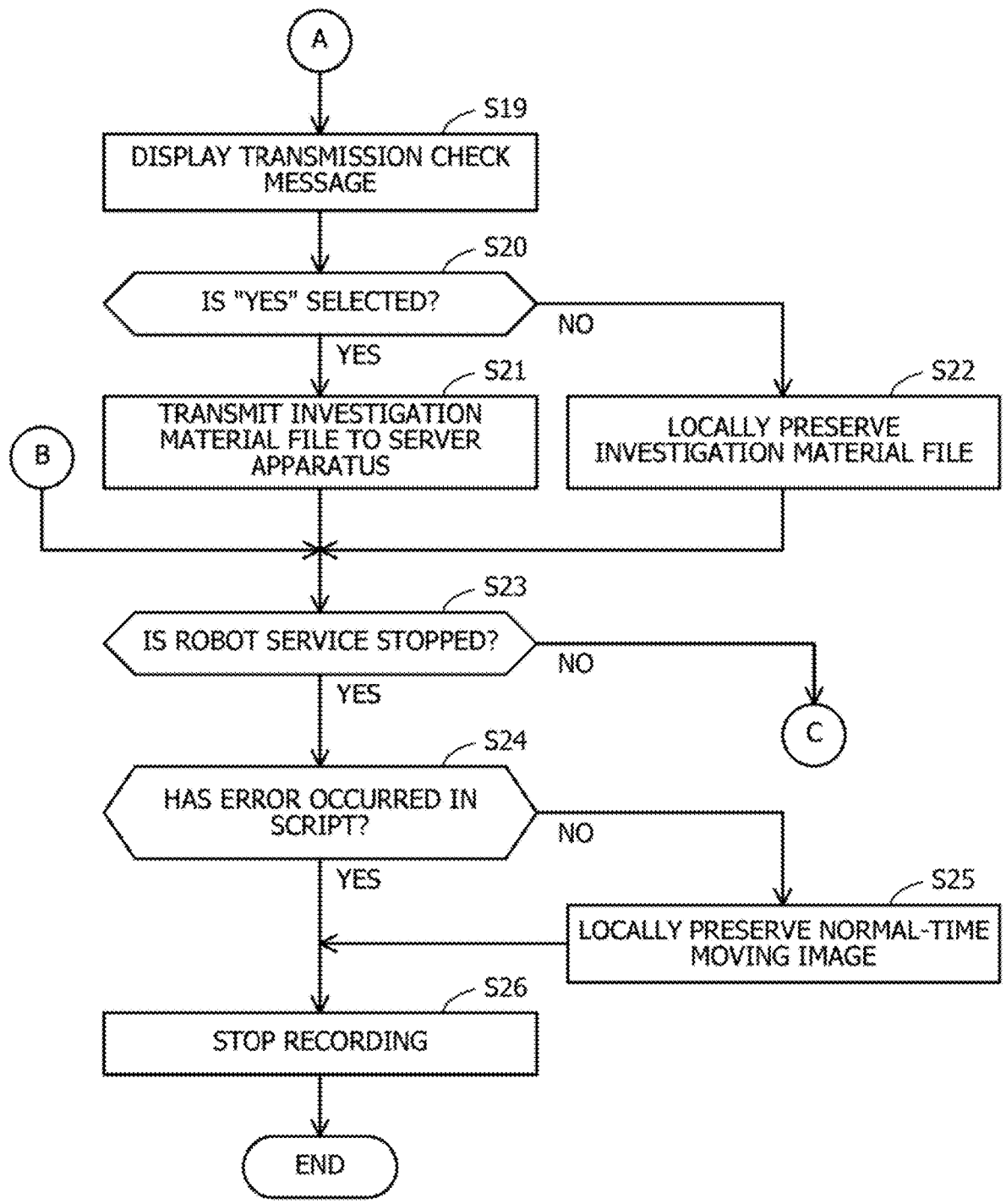
FIG. 9 is a flowchart illustrating a process example (continued) in the terminal apparatus.

FIG. 9 is a flowchart illustrating a process example (continued) in the terminal apparatus.

(S19) The investigation material creation unit 164 displays a transmission check message on the display 51. The transmission check message is, for example, a message having a content that "will you send error information (collected resources) to the technical supporter (server)? (YES/NO)".

(S20) The investigation material creation unit 164 determines whether or not "YES" is selected by the user 61 in response to the transmission check message in step S19. In a case where "YES" is selected, the process proceeds to step S21. In a case where "NO" is selected, the process proceeds to step S22.

(S21) The transmission unit 165 transmits the investigation material file 141 to the server apparatus 200. The process proceeds to step S23.

(S22) The investigation material creation unit 164 locally preserves the investigation material file 141. For example, the investigation material creation unit 164 preserves the investigation material file 141 in a nonvolatile storage device such as the HDD 103.

(S23) The moving image preservation unit 161 determines whether or not the robot service 150 is stopped. In a case where the robot service 150 is stopped, the process proceeds to step S24. In a case where the robot service is not stopped, the process proceeds to step S12 in FIG. 8.

(S24) The moving image preservation unit 161 determines whether or not an error has occurred in the currently executed script by inquiring of the log monitoring unit 162. In a case where an error has occurred, the process proceeds to step S26. In a case where no error has occurred, the process proceeds to step S25. The log monitoring unit 162 refers to the log 121 to determine whether or not an error has occurred in the script 111, and returns the determination result to the moving image preservation unit 161.

(S25) The moving image preservation unit 161 locally preserves the normal-time moving image. For example, the moving image preservation unit 161 preserves the normal-time moving image in a nonvolatile storage device such as the HDD 103. At this time, the moving image preservation unit 161 may attach identification information of the script executed this time point to the normal-time moving image and preserve the identification information. When an error occurs in a certain script, a normal-time moving image corresponding to the script may be easily retrieved.

(S26) The moving image preservation unit 161 stops recording the moving image. The process of the terminal apparatus 100 is finished.

As described above, when the robot service 150 used for executing the script is activated, the moving image extraction unit 163 starts to record a screen displayed over the display 51 of the terminal apparatus 100 and extracts error-time moving image data from the recorded data acquired by the recording.

As indicated in steps S15 and S16, the moving image extraction unit 163 extracts, along with the error-time moving image data, normal-time moving image data of a script that does not include an error corresponding to the script including the error log. As a result, in the investigation of a cause of the error by the technical supporter 62, not only an operation at the time of error occurrence but also an operation in a normal-time may be checked with respect to the corresponding script.

In step S14, in a case where a plurality of error logs are included in the script, the moving image extraction unit 163 may specify an error log occurring at a timing closest to a stop timing in the script among the plurality of error logs, and extract error-time moving image data based on time information correlated with the specified error log. For example, a log record indicating stopping of the script may be output after a relatively long time elapses from a recording timing of the error log. Therefore, by extracting the error-time moving image data based on the time information of the error log generated at the timing closest to the stop timing in the script, it is possible to suppress an excessively long error-time moving image from being acquired. The error log generated at the timing closest to the stop timing in the script may be an error log output last before the stop timing of the script. For example, the moving image extraction unit 163 may set a time point indicated by time information correlated with the last output error log as a termination of the error-time moving image. Alternatively, the moving image extraction unit 163 may set a time point after a predetermined time elapses from the time point indicated by the time information as a termination of the error-time moving image.

Next, an example of control of start/finish of recording in the moving image preservation unit 161 of the collecting agent 160 will be described.

Figure 10:
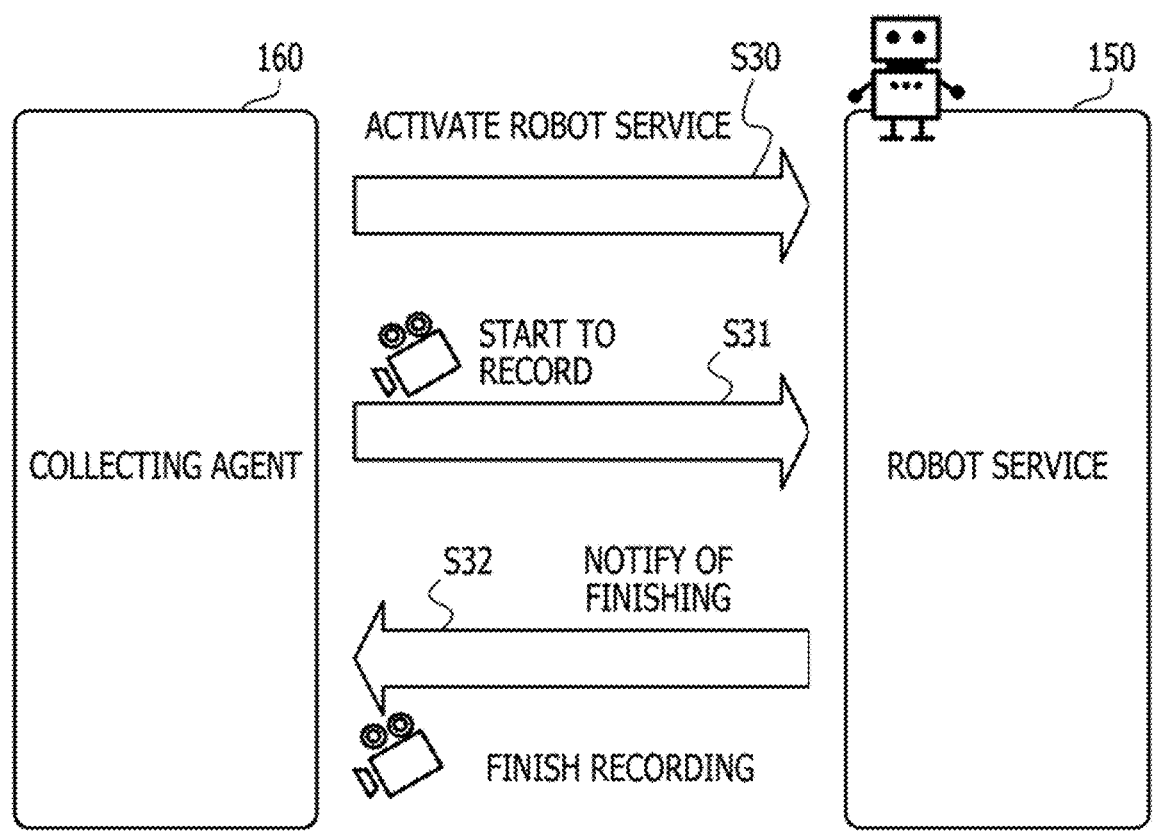
FIG. 10 is a diagram illustrating a first example of recording control.

FIG. 10 is a diagram illustrating a first example of recording control.

As a first example, the robot service 150 may be activated by the collecting agent 160.

First, the collecting agent 160 activates the robot service 150 (S30). The collecting agent 160 starts to record a desktop screen (S31). The robot service 150 starts to execute a script. The robot service 150 finishes the execution of the script. Then, the robot service 150 notifies the collecting agent 160 of the finishing, and stops the operation thereof (S32). When the finishing notification is received, the collecting agent 160 finishes the recording of the desktop screen.

Figure 11:
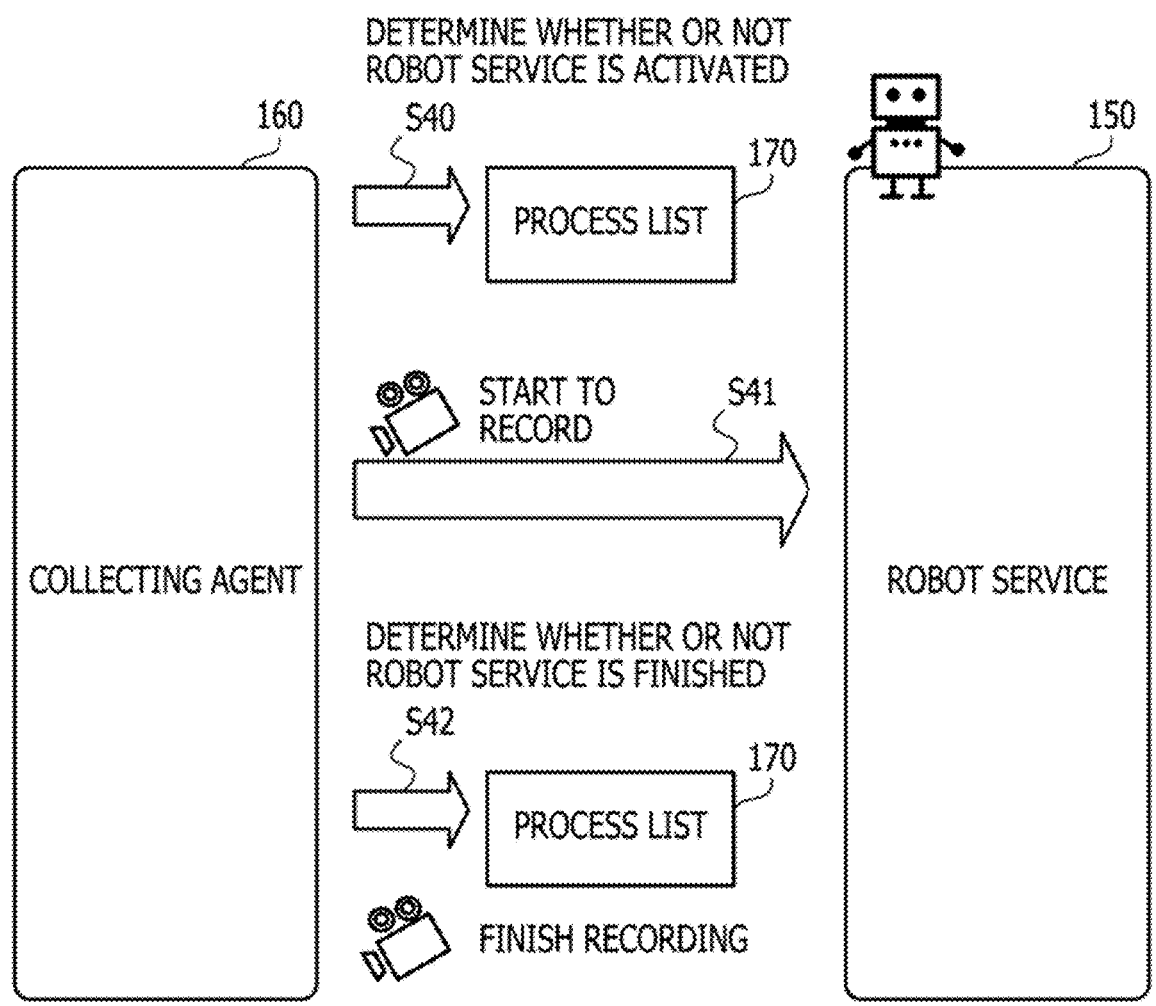
FIG. 11 is a diagram illustrating a second example of recording control.

FIG. 11 is a diagram illustrating a second example of recording control.

As a second example, the collecting agent 160 may detect activation and stopping of the robot service 150 with reference to a process list 170 that is a list of names of processes executed in the terminal apparatus 100. The process list 170 is, for example, information created by the OS and is stored in the RAM 102.

The collecting agent 160 refers to the process list 170, and determines whether or not the robot service 150 is activated (S40). When it is detected that a new process name of the robot service 150 is registered in the process list 170, the collecting agent 160 determines that the robot service 150 is activated, and starts to record a desktop screen (S41). The collecting agent 160 refers to the process list 170 and determines whether or not the robot service 150 is finished (S42). When it is determined that a process name of the robot service 150 is deleted from the process list 170, the collecting agent 160 determines that the robot service 150 is finished, and finishes the recording of the desktop screen.

Next, an example of log monitoring performed by the collecting agent 160 will be described.

Figure 12:
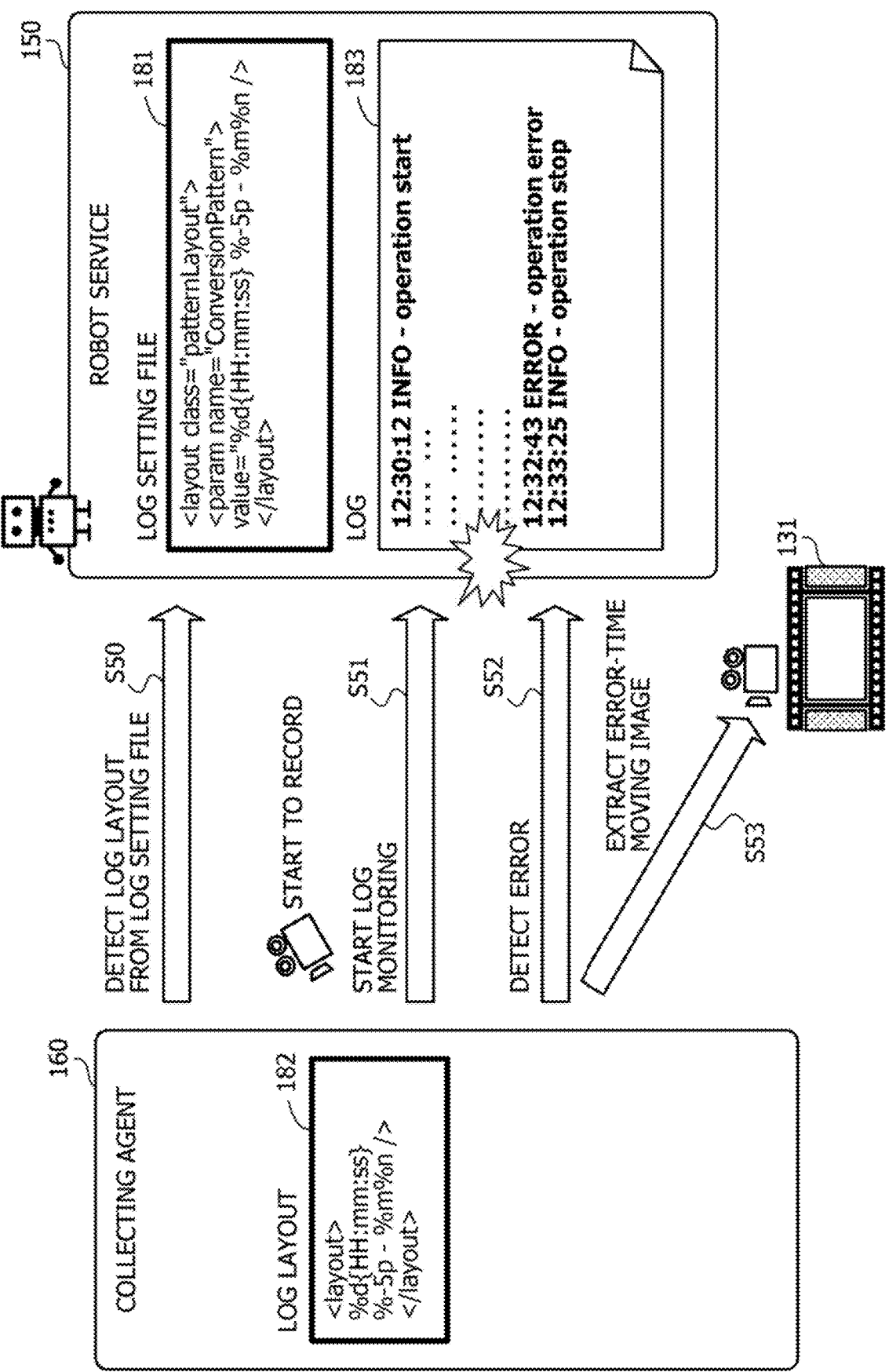
FIG. 12 is a diagram illustrating an example of log monitoring.

FIG. 12 is a diagram illustrating an example of log monitoring.

For example, a log library of predetermined open source software (OSS) may be used for a log output process in the robot service 150. In this case, the collecting agent 160 acquires a log layout 182 in advance based on a log setting file 181 of the robot service 150. The log setting file 181 is stored in advance in the RAM 102 or the HDD 103 as a setting file for the robot service 150. The log layout 182 is information indicating a log output pattern of the robot service 150. Alternatively, the log layout 182 may be created in advance by the user 61 and stored in advance in the RAM 102 or the HDD 103 as a setting file for the log monitoring unit 162.

For example, the collecting agent 160 detects the log layout 182 from the log setting file 181 for the robot service 150 (S50). In the example in FIG. 12, the collecting agent 160 generates, based on the log setting file 181, the log layout 182 indicating that a log record includes a time stamp, a log level, and a message indicating an event related to a script in this order with a space delimiter. In the example in FIG. 12, the identification information of the script is not recorded in the log 183. In this case, the collecting agent 160 may specify a script executed from other logs output from the robot service 150. Alternatively, the collecting agent 160 may acquire identification information of a script of which execution is started from the robot service 150 when the execution of the script is started, and specify the script.

After a desktop screen starts to be recorded, the collecting agent 160 starts to monitor the log 183 output by the robot service 150 based on the log layout 182 (S51).

The collecting agent 160 detects that a log record indicating an error is output to the log 183 based on the log layout 182 (S52). The collecting agent 160 acquires an error occurrence time from the log 183.

The collecting agent 160 detects an execution start time and an execution finish time of the script in which the error has occurred from the log 183, and extracts the error-time moving image 131 corresponding to the time period from the execution start time and the execution finish time from the moving image that is being recorded (S53).

Next, an example of the flow of a process in the collecting agent 160 will be described.

Figure 13:
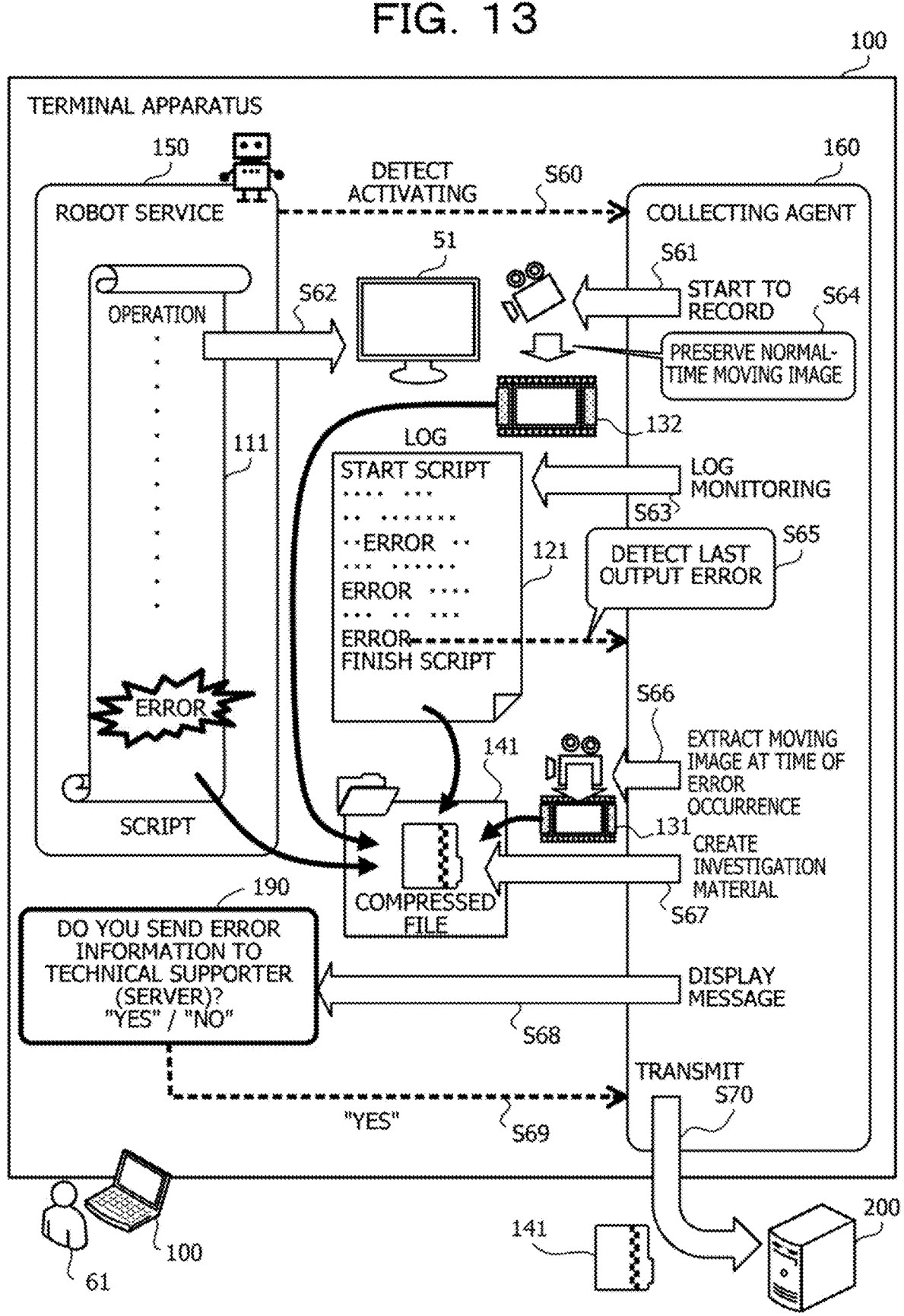
FIG. 13 is a diagram illustrating an example of a flow of a process executed by a collecting agent.

FIG. 13 is a diagram illustrating an example of a flow of a process by a collecting agent.

(S60) The collecting agent 160 detects activation of the robot service 150.

(S61) The collecting agent 160 starts to record a desktop screen displayed on the display 51.

(S62) The robot service 150 executes the script 111 to perform an operation on the desktop screen. When the script 111 is executed, the robot service 150 outputs the log 121 to the log storage unit 120.

(S63) The collecting agent 160 monitors the log 121 output to the log storage unit 120.

(S64) When the robot service 150 finishes the execution of the script 111 without outputting an error and stops the operation thereof, the collecting agent 160 preserves a normal-time moving image into the HDD 103.

Thereafter, when activation of the robot service 150 is detected again, the collecting agent 160 executes steps S60 to S63 and executes the following step S65.

(S65) The collecting agent 160 detects that a plurality of errors related to the script 111 are output to the log 121. The collecting agent 160 detects the last output error among the plurality of errors, and acquires a time point at which the last output error is output. The collecting agent 160 acquires an execution start time and an execution finish time of the corresponding script 111 from the log 121.

(S66) The collecting agent 160 extracts the error-time moving image 131 from a moving image that is being recorded.

(S67) The collecting agent 160 extracts the normal-time moving image 132 corresponding to the script 111 from the preserved normal-time moving image. The collecting agent 160 creates an investigation material file 141 that is a compressed file in which the script 111, the log 121, the error-time moving image 131, and the normal-time moving image 132 are collected. The collecting agent 160 preserves the investigation material file 141 into the investigation material storage unit 140.

(S68) The collecting agent 160 displays a transmission check message 190 on the display 51. The transmission check message 190 includes, for example, an inquiry to the user 61 that "do you want to send error information to the technical supporter (server)? "YES"/"NO"". The user 61 inputs "YES" or "NO" to the terminal apparatus 100 by operating the input device 52 in response to the inquiry using the transmission check message 190.

(S69) The collecting agent 160 receives an input of "YES" from the user 61.

(S70) The collecting agent 160 transmits the investigation material file 141 to the server apparatus 200.

In a case where the collecting agent 160 receives an input of "NO" in step S69, the collecting agent 160 stops recording, discards the moving image that is being recorded, and finishes the process. Even in this case, the user 61 may transmit the investigation material file 141 preserved in the investigation material storage unit 140 from the terminal apparatus 100 to the server apparatus 200 at a desired timing by using an electronic mail or the like.

Next, a description will be made of an example of reproducing the error-time moving image 131 and the normal-time moving image 132 in the server apparatus 200.

FIG. 14 is a diagram illustrating an example of reproducing a moving image in the server apparatus.

The moving image reproducing unit 230 displays a moving image reproduction screen 240 on a display coupled to the server apparatus 200 or a display of a terminal apparatus used by the technical supporter 62. The moving image reproduction screen 240 includes a normal-time moving image reproduction region 250 and an error-time moving image reproduction region 260.

The normal-time moving image reproduction region 250 is a screen region in which the normal-time moving image 132 is reproduced. The error-time moving image reproduction region 260 is a screen region in which the error-time moving image 131 is reproduced.

The moving image reproducing unit 230 reproduces the normal-time moving image 132 and the error-time moving image 131 in parallel in the normal-time moving image reproduction region 250 and the error-time moving image reproduction region 260. Thus, an operation in a normal-time and an operation at the time of error occurrence may be easily compared with each other by the technical supporter 62.

The time of the moving image may not coincide between the error-time moving image 131 and the normal-time moving image 132. In this case, the moving image extraction unit 163 may set a milestone in each moving image based on an output time point of a log record under the condition that a script that is a moving image capturing target is the same. The milestone is index information indicating a start point of a specific scene in a moving image.

For example, the moving image extraction unit 163 sets a milestone according to a change in the desktop screen in the error-time moving image 131 and the normal-time moving image 132. Examples of the change in the desktop screen include display of a new window, display of text information input to a predetermined form, and deletion of a window. The moving image extraction unit 163 may analyze the script 111, and may set a milestone to a timing at which a certain script calls another script, or a timing at which a process performed by another called script is completed and thus return to a process performed by the original script occurs.

In this case, when the error-time moving image 131 and the normal-time moving image 132 are reproduced in parallel, the moving image reproducing unit 230 may reproduce the moving images such that reproduction timings of the milestones set in the moving images match each other. For example, in a case where reproduction of one of the moving images is finished earlier, the moving image reproducing unit 230 may insert a standby during reproduction of the moving image that is finished earlier based on the milestone. The moving image reproducing unit 230 may change a reproduction speed of one of the moving images such that a reproduction start time matches a reproduction finish time.

The moving image reproduction screen 240 further includes a reproduction control button 241, a reproduction time display portion 242, a seek bar 243, and a moving image time display portion 244.

The reproduction control button 241 is a button for receiving an input of reproduction/pause of parallel reproduction of the normal-time moving image reproduction region 250 and the error-time moving image reproduction region 260. The technical supporter 62 may operate an input device coupled to the server apparatus 200 or an input device of the terminal apparatus used by the technical supporter 62 to perform an input on the reproduction control button 241.

The reproduction time display portion 242 is a region in which an elapsed time from the start of reproduction of a moving image that is being reproduced is displayed.

The seek bar 243 is a form for indicating an elapsed time from the start of reproduction of a moving image during parallel reproduction and for receiving an input of a seek time position of the moving image. When a seek time position is input by using the seek bar 243, the moving image reproducing unit 230 performs parallel reproduction of both moving images from a position corresponding to the seek time position.

The moving image time display portion 244 is a region in which the time from the start to the finish of the moving image is displayed. For example, in a case where the error-time moving image 131 is a moving image from the start to the finish of execution of the script, a time displayed on the moving image time display portion 244 is a time corresponding to the finish of the execution of the script. In this case, as described above, information regarding the seek time position corresponding to the time of the last output error of the script may be set in the error-time moving image 131. For example, the moving image reproducing unit 230 may display a button or the like for jumping to the seek time position on the moving image reproduction screen 240 to assist the technical supporter 62 in easily searching for a moving image at the error time position. Alternatively, in a case where the error-time moving image 131 is a moving image from the start of execution of a script to the time of a last output error of the script, a time displayed on the moving image time display portion 244 is a time corresponding to the time of the last output error of the script.

In the example in FIG. 14, windows 251 and 252 are displayed in the normal-time moving image reproduction region 250. The window 251 is an operation screen for spreadsheet software. The window 252 is an operation screen for data input software. For example, a series of screen operations including a screen operation of inputting each of a plurality of data items displayed in the window 251 to each form of the window 252 and pressing a preservation button of the window 252 is automated by the RPA.

Windows 261, 262, and 263 are displayed in the error-time moving image reproduction region 260. The window 261 corresponds to the window 251. The window 262 corresponds to the window 252. The window 263 is an error message output screen displayed by the robot service 150. In the error-time moving image reproduction region 260, the fact that information regarding the data item corresponding to a product name is not acquirable from the window 261 to the window 262 due to an error during the execution of the script is displayed in the window 263.

In the example of the second embodiment, the server apparatus 200 includes the moving image reproducing unit 230, but the terminal apparatus 100 may also have the function of the moving image reproducing unit 230. In this case, the terminal apparatus 100 may also display the moving image reproduction screen 240 on the display 51 and reproduce the error-time moving image 131 and the normal-time moving image 132 in parallel as described above. The user 61 may investigate a cause of the error or receive the support of the technical supporter 62 while the user 61 checks an event at the time of the error occurrence on the same screen as the technical supporter 62.

In the RPA, information is extracted based on display information on a desktop screen. Thus, even though a script may be normally executed at a certain time point, when at least a part of the display information is changed due to a setting change or the like in operation target software (for example, spreadsheet software), an error may occur during execution of the script at another time point. The technical supporter 62 checks the normal-time moving image 132 and the error-time moving image 131 while comparing the images with each other, and may thus smoothly analyze a cause of the error along with a source program and a log of the script.

In technical support of RPA programming, the technical supporter 62 may be inquired about a programming method or a design method of robot processing of the RPA, for example, with an electronic mail. However, it is difficult for the technical supporter 62 to extract detailed error information of the robot processing of the RPA and to accurately understand contents of the inquiry from the user 61 based on only the text of the electronic mail. Thus, there is a problem that the technical supporter 62 may not accurately respond to a problem occurring in the field or an inquiry, or it takes time to respond.

On the other hand, on-site technical support by the technical supporter 62 is also conceivable. However, in the on-site support, the technical supporter 62 goes to the user 61, which increases the burden on the technical supporter 62. It may be difficult to perform the on-site support due to geographical factors, for example, the base of the user 61 being far from the base of the technical supporter 62.

It is also conceivable to share a voice and a desktop screen between the user 61 and the technical supporter 62 by using a videophone system or the like, and to perform support in a pair programming form. For example, a support method is conceivable in which the technical supporter 62 responds to an inquiry from the user 61 by voice while viewing a screen of an RPA development environment of the user 61. However, such a support method may be realized only in a case where schedules of the user 61 and the technical supporter 62 match each other.

An RPA program is created in a flowchart format by the support tool, for example. Therefore, even though a bug in a program is solved via an electronic mail or a videophone system, in a case where another bug occurs immediately in another place, the user 61 has to ask a question each time. However, in the electronic mail and the video telephone system, basically, a question and answer form is used. Thus, there is a problem that the user 61 may not solve all problems unless all items to be asked are extracted in advance when making an inquiry.

Therefore, with respect to the problem related to technical support of the RPA, there is a demand for a technical support method for performing support in such a manner that the user 61 extracts a problem occurring at the time of programming the RPA with a relatively short time and the technical supporter 62 may make a response.

In contrast, according to the terminal apparatus 100 of the second embodiment, it is possible to automatically acquire an investigation material used for technical support for an error occurring in the terminal apparatus 100. Thus, the user 61 does not have to perform work of collecting information. It is possible to quickly acquire investigation materials. The technical supporter 62 may quickly search for an error occurrence location that has to be investigated based on information included in the investigation materials. Since the error-time moving image 131 and the normal-time moving image 132 included in the investigation material may be reproduced in parallel, the technical supporter 62 may check or investigate an event while contrasting a difference between a normal operation time and an error occurrence time.

For example, since an error-time moving image is automatically cut out based on an execution start time and an execution finish time of a script work of the technical supporter 62 checking a moving image is simplified. Even in a case where a plurality of errors occur in a plurality of scripts, the technical supporter 62 may acquire an error-time moving image for each script, and may thus easily check an operation screen at the time of error occurrence. It is possible to improve the extraction accuracy of an error-time moving image and thus to appropriately acquire the error-time moving image compared with a time designation method in which the user 61 designates a time range and extracts the error-time moving image. For example, it is possible to suppress the acquired error-time moving image from including a moving image at the time of execution of a script unrelated to an error or including only a part of a moving image at the time of execution of a script related to the error.

As described above, according to the terminal apparatus 100, it is possible to efficiently extract moving image data at the time of error occurrence. The investigation of a cause of an error may be efficient performed by the technical supporter 62.

The information processing of the first embodiment may be realized by causing the processing unit 12 to execute a program. The information processing of the second embodiment may be realized by causing the CPU 101 to execute a program. The programs may be recorded in a computer-readable recording medium 53.

For example, the program may be circulated by distributing a recording medium 53 in which the program is recorded. The program may be stored in another computer, and the program may be distributed through a network. For example, the computer may store (install) the program recorded in the recording medium 53 or the program received from another computer in a storage device such as the RAM 102 or the HDD 103, read the program from the storage device, and execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
    determining whether a plurality of error logs are included in an operation log of a terminal;
    when the plurality of error logs are included in the operation log,
        specifying a start timing and a stop timing of a first script including the plurality of error logs stored in a memory based on first time information included in the operation log, and
        determining a first error log at a timing closest to the stop timing in the first script among the plurality of error logs; and
    extracting moving image data correlated with the first error log based on the timing.

2. The non-transitory computer-readable storage medium according to claim 1, wherein,
    the process further comprising extracting, along with the extracted moving image data, moving image data during execution of a second script not including an error corresponding to the first script.

3. The non-transitory computer-readable storage medium according to claim 1, wherein
    the process further comprising:
    when a service used for executing the script is activated, starting recording of a screen displayed over the terminal; and
    extracting moving image data from recorded data that is acquired through the recording.

4. The non-transitory computer-readable storage medium according to claim 1, wherein
    the extracted moving image data, the script, and the operation log are transmitted to an information processing apparatus.

5. The non-transitory computer-readable storage medium according to claim 1, wherein
    index information indicating a start point of a specific scene in moving image data is set in piece of moving image data extracted for the first script.

6. An information processing method executed by a computer, the information processing method comprising:
    determining whether a plurality of error logs are included in an operation log of a terminal;
    when the plurality of error logs are included in the operation log,
        specifying a start timing and a stop timing of a first script including the plurality of error logs stored in a memory based on first time information included in the operation log, and
        determining a first error log at a timing closest to the stop timing in the first script among the plurality of error logs; and
    extracting moving image data correlated with the first error log based on the timing.

7. An information processing apparatus, comprising:
    a memory; and
    a processor coupled to the memory and configured to:
        determining whether a plurality of error logs are included in an operation log of a terminal,
        when the plurality of error logs are included in the operation log,
            specifying a start timing and a stop timing of a first script including the plurality of error logs stored in a memory based on first time information included in the operation log, and
            determining a first error log at a timing closest to the stop timing in the first script among the plurality of error logs, and
        extracting moving image data correlated with the first error log based on the timing.

8. The information processing apparatus according to claim 7, wherein the processor is configured to extract, along with the extracted moving image data, moving image data during execution of a second script not including an error corresponding to the first script.

9. The information processing apparatus according to claim 7, wherein the processor is configured to:
    when a service used for executing the script is activated, start recording of a screen displayed over the terminal, and
    extract moving image data from recorded data that is acquired through the recording.

10. The information processing apparatus according to claim 7, wherein
    the extracted moving image data, the script, and the operation log are transmitted to an information processing apparatus.

11. The information processing apparatus according to claim 7, wherein index information indicating a start point of a specific scene in moving image data is set in each piece of moving image data extracted for the script.

\* \* \* \* \*